United States Patent [19]
Von Hoessle et al.

[11] Patent Number: 5,710,853
[45] Date of Patent: Jan. 20, 1998

[54] COIL FORM

[75] Inventors: Wolfgang Von Hoessle, Riemerling; Kuno Roder, Eglharting; Elmar Albert, Neidlingen, all of Germany

[73] Assignee: Daimler-Benz Aerospace AG, Ottobrunn, Germany

[21] Appl. No.: 699,727

[22] Filed: Jul. 30, 1996

[30] Foreign Application Priority Data

Aug. 2, 1995 [DE] Germany .................. 195 28 347.3

[51] Int. Cl.⁶ .................................................. G02B 6/10
[52] U.S. Cl. ................ 385/123; 385/147; 385/134; 385/128; 156/175; 156/428
[58] Field of Search .......................... 156/166, 167, 156/169, 172, 173, 175, 428; 385/123, 147, 134, 128, 136, 115, 121

[56] References Cited

U.S. PATENT DOCUMENTS

| 5,181,270 | 1/1993 | Hsu et al. ........................ 385/134 |
| 5,261,023 | 11/1993 | Darsey ............................ 385/134 |
| 5,594,829 | 1/1997 | Lostracco et al. ............... 385/134 |

*Primary Examiner*—John Ngo
*Attorney, Agent, or Firm*—McGlew and Tuttle

[57] ABSTRACT

A coil support and a winding arranged thereon, especially one including a fiber-optic waveguide, whose turns are mutually fixed by a binding agent. The binding agent drys while a volatile solvent diffuses off. The coil support is permeable to solvent and is designed such that it has essentially the same coefficient of thermal expansion as the winding. This achieves the uniform, thorough drying of the binding agent over the entire winding and reduces the risk of damage to the fiber-optic waveguide during the transportation and the unwinding of the winding in a coil form.

17 Claims, 1 Drawing Sheet

COIL FORM

FIELD OF THE INVENTION

The present invention pertains to a coil form with a coil support and a winding arranged thereon, whose turns are mutually fixed by a binding agent drying while a volatile solvent diffuses off.

BACKGROUND OF THE INVENTION

One important field of application of coil forms of this class is that, with a fiber-optic waveguide of a length of up to 100 km wound on them, they are carried on board an airplane or missile, or a land vehicle or a watercraft, and the fiber-optic waveguide is then unwound from the coil form mounted stationarily on the vehicle in the axial direction of the coil form during the flight or during the travel opposite to the direction of travel to thus make possible a continuous exchange of data of high transmission density via the fiber-optic waveguide on the way between the moving vehicle and a receiving site.

During the winding on of the coil form, the fiber-optic waveguide is provided with a binding agent in the form of an adhesive or lacquer layer, which contains a volatile solvent and forms a coil bond between the individual turns of the winding after drying. Such a bonding or adhesive layer imparts the necessary strength to the winding to prevent it from being destroyed during vibrations or other mechanical stresses to the extent that a loss of function develops, i.e., e.g., the winding disintegrates into individual coil layers, during the subsequent rapid pull-off of the fiber-optic waveguide. A relatively high adhesive force is therefore desirable. On the other hand, the friction of the fiber-optic waveguide and the tensile stress acting during the unwinding should not become too high, so that the adhesive force must be kept within defined limits. The run-off behavior of the fiber-optic waveguide is strongly affected by nonuniform, abruptly changing adhesive forces, and microbends of the fiber-optic waveguide, which may interfere with the signal transmission and may even lead to a complete failure of the system, may develop especially at the point of separation from the winding. A defined adhesive force and consequently uniform drying of the bond over the entire winding are therefore required.

However, the binding agent dries very rapidly on the air-side outer surfaces of the winding in the prior-art coil forms of the class described in the introduction, so that an adhesive or lacquer film, which prevents the further diffusion of the solvent from the interior of the winding and consequently the drying of the coil bond from the deeper layers of the coil, is formed there. The consequence of this is that the winding has a nonuniform coil bond without defined adhesive forces even after longer storage times and there is a risk that the remaining solvent residues penetrate into the fiber-optic waveguide and increase the basic attenuation of the fiber-optic waveguide there or even allow predetermined breaking points to form there, which lead to an interruption of the signal transmission during the subsequent unwinding of the fiber-optic waveguide. In addition, the coil form is frequently exposed to great variations in temperature during transportation, which cause tensile stresses in the winding, so that the signal transmission properties of the fiber-optic waveguide are already impaired before it is unwound from the coil form at the site of use for data exchange purposes.

According to an older patent application, which was not previously published, it was suggested that the coil support be made of a porous material having open pores with a diffusion coefficient for the solvent that is essentially equal to or slightly lower than that of the winding. As a consequence, the solvent is able to continuously diffuse radially inwardly from the interior of the winding on the way through the coil support and to escape into the surrounding atmosphere, without a diffusion-inhibiting barrier layer in the form of an adhesive or lacquer film being formed at the interface between the winding and the coil support until the binding agent has dried completely. The solvent residues in the interior of the winding are thus reduced and a markedly more uniform coil bond is achieved between the individual turns over the entire winding.

SUMMARY AND OBJECTS OF THE INVENTION

According to a patent application, which was not previously published, it was suggested that the coil support be made of a porous material having open pores with a diffusion coefficient for the solvent that is essentially equal to or slightly lower than that of the winding. As a consequence, the solvent is able to continuously diffuse radially inwardly from the interior of the winding via the coil support and to escape into the surrounding atmosphere, without a diffusion-inhibiting barrier layer in the form of an adhesive or lacquer film being formed at the interface between the winding and the coil support until the binding agent has dried completely. The solvent residues in the interior of the winding are thus reduced and a markedly more uniform coil bond is achieved between the individual turns over the entire winding.

The primary object of the present invention is to design the coil form of the type described in the introduction such that damage to the winding during transportation and the subsequent use of the coil form is effectively avoided even if the winding consists of a wound material that is susceptible to being damaged, especially a fiber-optic waveguide.

According to the invention, a coil form is provided, comprising a coil support and a winding arranged thereon, whose turns are mutually fixed by a binding agent drying while a volatile solvent diffuses off. The coil support is formed as a solvent-permeable coil support having substantially the same coefficient of thermal expansion ($\alpha$) as that of the winding.

On the one hand, a diffusion path is made open according to the present invention for the solvent on the inside of the winding through the coil support due to the special design of the coil form, so that the binding agent dries even in the deeper, coil support-side coil layers and, thus, the required, defined coil bond is obtained and, on the other hand, excessive elongation of the winding, which is caused by the higher thermal expansion of the coil support compared with the winding, as well as a temperature-dependent separation of the winding from the coil support, caused by a comparatively greater thermal contraction of the coil support, are prevented from occurring with certainty, and the two measures together consequently ensure that the risk of damage to the coil material is effectively reduced, i.e., the high signal transmission quality is preserved undisturbed during the storage, transportation and unwinding process e.g. in the case of winding with a fiber-optic waveguide.

To improve the removal of the solvent during the drying of the binding agent, the coil support has, in an especially preferred manner, essentially the same diffusion coefficient for the solvent as the winding or a slightly lower diffusion coefficient, as a result of which it is guaranteed that the drying process takes place relatively continuously until the complete drying of the entire winding. To achieve the required permeability to solvent, the coil support is advantageously made of a porous material having open pores and/or is provided with diffusion holes.

For weight reasons, but also to keep the diffusion paths in the coil support short, the coil support is preferably designed as a thin-walled hollow structure, preferably a thin walled (wall thickness<<other dimensions) cylinder that is permeable to solvent in the wall area.

In the preferred application of the present invention, in which the winding consists of a fiber-optic waveguide provided with an adhesive layer as a binding agent, the coil support is advantageously made of a ceramic material, whose coefficient of thermal expansion is essentially equal to that of a pure glass fiber, i.e., it is made of, e.g., silicon nitride or aluminum oxide.

Finally, as was mentioned above, the coil form is preferably arranged non-rotatably in unison on board a vehicle for signal transmission purposes, and the coil material, i.e., preferably the fiber-optic waveguide, is pulled off in the axial direction of the coil form during the flight or during the travel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
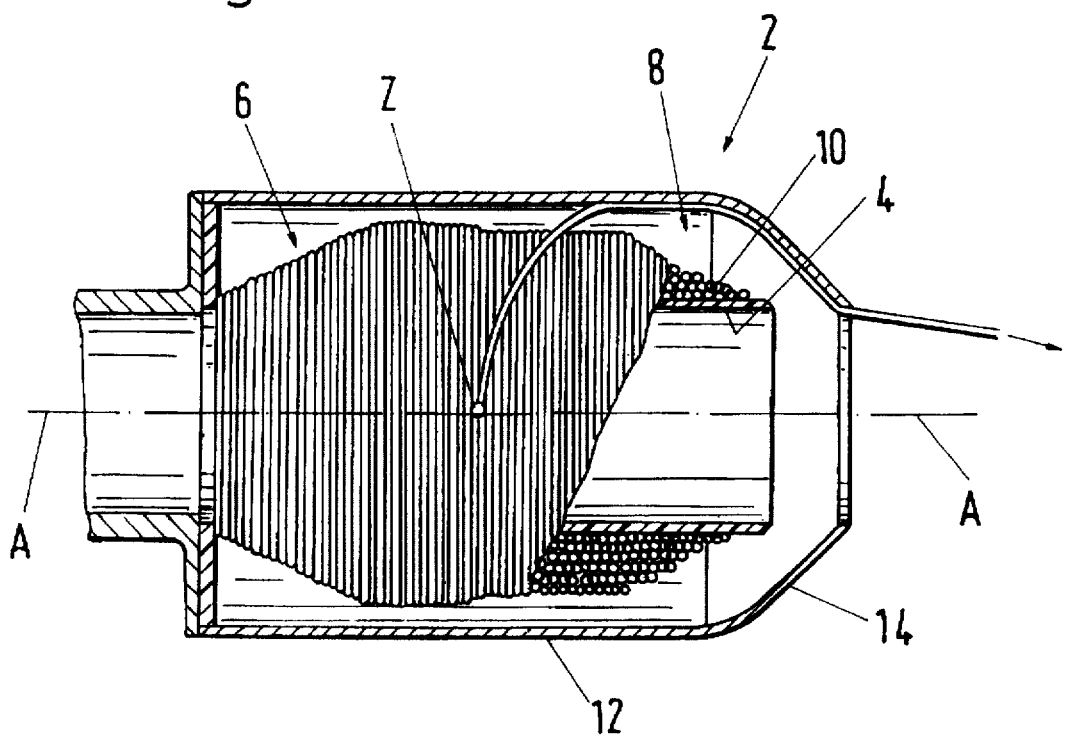
FIG. 1 is a schematic partially cutaway view of a coil form, with a winding comprising a fiber-optic waveguide, during the unwinding process.

Referring to the drawings in particular, the invention comprises a coil form 2, including as principal components a thin-walled, hollow cylindrical coil support 4 and a winding 6 wound on the hollow cylindrical coil support 4. The winding 6 comprises a fiber-optic waveguide 8, which is wound endlessly on the coil support 4 in turns located tightly next to and one on top of another. The thickness of the fiber-optic waveguide 8 is greatly exaggerated, in the drawings, for clarity's sake. The winding 6 does in fact contain a several times greater number of coil layers and individual turns located next to each other.

During the winding process, the fiber-optic waveguide 8 is provided with a solvent-containing binding agent 10 in the form of an adhesive or lacquer layer, with which the fiber-optic waveguide 8 is coated either before the winding station, e.g., in a dipping bath, not shown, or it is applied, e.g., by means of a brush, to a coil layer after it has been wound up. In the dried state, the binding agent 10 imparts the required strength to the winding 6 to prevent it from being destroyed during vibrations or other mechanical impact loads; however, on the other hand, the coil bond brought about by the binding agent 10 must not be strong enough to cause malfunctions during the subsequent rapid unwinding of the fiber-optic waveguide 8.

FIG. 1 shows the coil form 2 during the unwinding process on board an airplane or missile, on board a land vehicle or onboard a watercraft (not shown). The coil form 2 is mounted stationarily and is enclosed in an outer shell 12 with a run-off funnel 14 tapering in the rearward direction against the direction of flight or travel. The fiber-optic waveguide 8, which makes possible a continuous data exchange between the moving vehicle and a receiving station (likewise not shown), to which the free end of the fiber-optic waveguide is connected, performs a rotary movement around the axis A of the coil form, namely, once for each coil turn pulled off, during the unwinding process, so that it rises to the outside in the direction of the shell 12 under the action of the centrifugal force resulting from this essentially tangentially to the instantaneous pull-off point Z from the winding 6, and it runs off from here via the run-off funnel 14 in the rearward direction. A defined coil bond, which is free from abrupt changes in the adhesive or bonding forces, is necessary between the turns of the winding 6 for a trouble-free unwinding process.

To achieve this, the solvent must have diffused nearly completely out of the winding 6. At the end of the winding process, the binding agent 10 first still has a comparatively high solvent concentration, which is essentially constant over the entire radial coil thickness of the winding 6. As a consequence of the unhindered evaporation of the solvent on the air-side outer surfaces of the winding 6, a film of binding agent is formed there very rapidly, and it acts as a diffusion-inhibiting barrier layer and prevents the further transportation of solvent from the interior of the winding 6 to the surrounding atmosphere. Therefore, prior-art coil forms continue to have high solvent concentrations at the coil layers located farther inward and a highly nonuniform state of drying, which changes abruptly toward the outside, even after longer drying times.

In addition, there are disturbing effects caused by variations in temperature, which lead to different thermal expansions of the coil support 4 and of the winding 6 and may cause damage to the winding 6 either because the coiled material on the coil support 4 is excessively elongated and microcracks are formed in the fiber-optic waveguide 8, or the winding 6 separates from the coil support 4 and therefore it cannot be unwound properly during the subsequent rapid unwinding of the fiber-optic waveguide 8.

Figure 2:
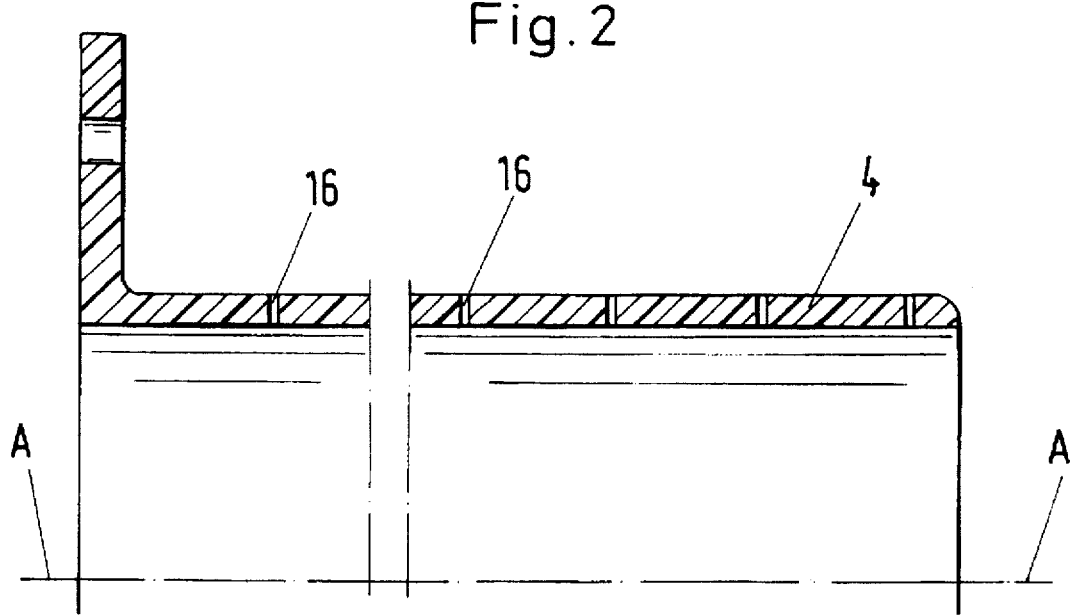
FIG. 2 is an enlarged detailed view of the coil support according to FIG. 1 prior to the winding on of the winding.

These disturbing effects are reduced by the design of the coil support 4 described below such that a nearly complete drying of the binding agent 10 is guaranteed over the entire winding 6 even in the case of a very great radial winding thickness, and excessive stretching of the fiber-optic waveguide 8 or a lifting off of the winding 6 from the coil support 4 are even under the effect of greater variations in temperature. The coil support 4 is made for this purpose, at least in its cylindrical wall area, of a sintered ceramic, which has—besides a high mechanical strength, a low specific gravity and good heat and corrosion resistance—a coefficient of thermal expansion that is as close to that of the fiber-optic waveguide 8 as possible. The coefficient of thermal expansion of the fiber-optic waveguide 8 depends on the type of glass used and equals $\alpha=0$ to $2\times10^{-6}/K$ for a pure quartz glass fiber. A ceramic material with a correspondingly low $\alpha$, e.g., silicon nitride ($\alpha=3.2$) or even aluminum oxide ($\alpha=8.5$) is selected for the coil support 4. The ceramic material of the coil support 4 is at the same time designed as a ceramic material that is permeable to the solvent of the binding agent by providing the basic ceramic material with a plurality of diffusion holes 16 (FIG. 2) in the cylindrical section of the coil support during the so-called green processing after pressing but before sintering, and/or by making the coil support 4 of a ceramic material that is inherently porous and has open pores.

After sintering, the coil support 4 has a degree of porosity between about 70% and 97%, which is selected as a function of the solvent such that the coil support 4 has approximately the same diffusion coefficient for the solvent as the winding 6 or a slightly lower diffusion coefficient. As a consequence, the solvent diffuses through the coil support 4 during the drying of the winding 6 and escapes into the surrounding atmosphere without a diffusion-preventing or -interrupting barrier layer in the form of an adhesive or lacquer film being formed at the interface between the coil support 4 and the winding 6, because the binding agent 10 cannot dry immediately at this interface. Thus, more solvent diffuses continuously from the interior of the winding 6, so that the solvent concentration slowly decreases over the entire radial width of the winding 6 until the winding 6 is completely dried. An extensively solvent residue-free, uniform coil bond is obtained over the entire winding 6 after the end of the drying process.

The suitable binding agents 10 include both adhesives or lacquers with a readily volatilizing solvent, such as toluene, in conjunction with a relatively low degree of porosity of the coil support 4, and those based on water, which require a correspondingly higher degree of porosity of the coil support 4.

In addition, the coil support 4 may be provided on the outside of the cylindrical wall section with winding grooves for the first winding layer of the fiber-optic waveguide winding 6, which are also prepared during the green processing of the basic ceramic material. A fine surface finish is optionally recommended after the sintering of the coil support 4, e.g., at the rear end. However, it is also possible to attach by bonding an end cap, e.g., one made of plastic, if this is necessary for the smooth pulling off of the fiber-optic waveguide 8.

While a specific embodiment of the invention has been shown and described in detail to illustrate the application of the principles of the invention, it will be understood that the invention may be embodied otherwise without departing from such principles.

What is claimed is:

1. A coil form, comprising:
   a coil support having a coil support wall with a winding receiving area;
   a winding arranged on said coil support wall at said winding receiving area, said winding having turns mutually fixed by a binding agent containing a volatile solvent, said binding agent drying while said volatile solvent diffuses off, said coil support having substantially, the same coefficient of thermal expansion ($\alpha$) as said winding,
   said coil support winding receiving area being solvent-permeable, said winding receiving area being covered by said winding to define a solvent diffusion region whereby said binding agent is dried while said solvent diffuses through said coil support wall.

2. A coil form in accordance with claim 1, wherein said coil support wall has a coil diffusion coefficient for said volatile solvent, and said winding has a winding diffusion coefficient for said volatile solvent, said coil diffusion coefficient being substantially the same as said winding diffusion coefficient.

3. A coil form in accordance with claim 1, wherein said coil support wall has a coil diffusion coefficient for said volatile solvent, and said winding has a winding diffusion coefficient for said volatile solvent, said coil diffusion coefficient being slightly lower than said winding diffusion coefficient.

4. A coil form in accordance with claim 1, wherein said coil support wall is formed of a porous material, having open pores.

5. A coil form in accordance with claim 1, wherein said coil support wall is provided with diffusion holes.

6. A coil form in accordance with claim 1, wherein said coil support wall comprises a hollow cylinder.

7. A coil form in accordance with claim 1, wherein said coil support comprises a ceramic material and said winding comprises a fiber-optic waveguide provided with an adhesive layer as said binding agent.

8. A coil form in accordance with claim 1, wherein said coil support consists essentially of a ceramic material and said winding consists essentially of a fiber-optic waveguide provided with an adhesive layer as said binding agent.

9. A coil form in accordance with claim 7, wherein said coil support is arranged non-rotatably on board a vehicle, and the said fiber-optic waveguide is supported to be pulled off in an axial direction of the coil form.

10. A process for forming a coil form, comprising the steps of:
    providing a coil support;
    disposing a winding on said coil support, said coil support being a solvent-permeable coil support having substantially the same coefficient of thermal expansion ($\alpha$) as said winding;
    fixing said turns of said winding with a binding agent including
    applying said binding agent with a volatile solvent; and
    drying said binding agent while said volatile solvent diffuses off.

11. A process in accordance with claim 10, wherein said coil support has a coil diffusion coefficient for said volatile solvent, and said winding has a winding diffusion coefficient for said volatile solvent, said coil diffusion coefficient being selected to be substantially the same as said winding diffusion coefficient.

12. A process according to claim 10, wherein said coil support has a coil diffusion coefficient for said volatile solvent, and said winding has a winding diffusion coefficient for said volatile solvent, said coil diffusion coefficient being selected to be slightly lower than said winding diffusion coefficient.

13. A process according to claim 10, further comprising the step of forming coil support of a porous material having open pores.

14. A process according to claim 10, further comprising the step of providing said support with diffusion holes.

15. A process according to claim 10, further comprising the step of providing said support as a hollow cylinder.

16. A process according to claim 10, further comprising the step of forming said coil support of a ceramic material and forming said winding of a fiber-optic waveguide provided with an adhesive layer as said binding agent.

17. A process according to claim 10, further comprising the step of arranging said coil support non-rotatably on board a vehicle, and arranging said fiber-optic waveguide to be pulled off in an axial direction of the coil form.

* * * * *